US008185631B2

(12) United States Patent
Fuente et al.

(10) Patent No.: US 8,185,631 B2
(45) Date of Patent: May 22, 2012

(54) CONTROLLING SERVICE FAILOVER IN CLUSTERED STORAGE APPARATUS NETWORKS

(75) Inventors: Carlos F. Fuente, Portsmouth (GB); William J. Scales, Fareham (GB)

(73) Assignee: International Business Machines Corporation, Armonk, NY (US)

( * ) Notice: Subject to any disclaimer, the term of this patent is extended or adjusted under 35 U.S.C. 154(b) by 1578 days.

(21) Appl. No.: 11/249,189

(22) Filed: Oct. 13, 2005

(65) Prior Publication Data

US 2006/0168256 A1     Jul. 27, 2006

(30) Foreign Application Priority Data

Jan. 27, 2005  (GB) .................................. 0501697.7

(51) Int. Cl.
*G06F 15/173* (2006.01)

(52) U.S. Cl. ........ 709/226; 709/223; 709/224; 709/225; 714/4.11; 714/703; 370/230; 370/248; 370/389

(58) Field of Classification Search .......... 709/203–228, 709/229; 711/114; 713/151
See application file for complete search history.

(56) References Cited

U.S. PATENT DOCUMENTS

| | | | | |
|---|---|---|---|---|
| 5,481,738 A * | 1/1996 | Bartow et al. | ................. | 709/220 |
| 5,790,548 A * | 8/1998 | Sistanizadeh et al. | ........ | 370/401 |
| 5,991,768 A * | 11/1999 | Sun et al. | ............................... | 1/1 |
| 6,330,326 B1 * | 12/2001 | Whitt | ........................ | 379/265.13 |
| 6,775,703 B1 * | 8/2004 | Burns et al. | .................... | 709/228 |
| 6,834,332 B2 * | 12/2004 | Craddock et al. | ............. | 711/159 |
| 6,874,066 B2 * | 3/2005 | Traversat et al. | ............. | 711/135 |
| 6,898,618 B1 * | 5/2005 | Slaughter et al. | ............. | 709/203 |
| 6,909,995 B2 * | 6/2005 | Shiraishi | ........................ | 702/188 |
| 6,934,755 B1 * | 8/2005 | Saulpaugh et al. | ........... | 709/226 |
| 6,957,237 B1 * | 10/2005 | Traversat et al. | ..................... | 1/1 |
| 7,007,047 B2 * | 2/2006 | Zelenka et al. | ........................ | 1/1 |
| 7,055,053 B2 * | 5/2006 | Saika | ................................ | 714/4 |
| 7,069,320 B1 * | 6/2006 | Chang et al. | .................. | 709/225 |
| 7,194,543 B2 * | 3/2007 | Robertson et al. | ............ | 709/226 |
| 7,240,234 B2 * | 7/2007 | Morita et al. | ...................... | 714/4 |
| 7,243,142 B2 * | 7/2007 | Poirot et al. | ................... | 709/220 |
| 7,269,623 B2 * | 9/2007 | Neely et al. | ................... | 709/205 |
| 7,286,529 B1 * | 10/2007 | Thomas | ........................ | 370/389 |
| 7,287,004 B2 * | 10/2007 | Kenny et al. | ................. | 705/26.8 |
| 7,318,101 B2 * | 1/2008 | Droms | .......................... | 709/229 |

(Continued)

OTHER PUBLICATIONS

R.Droms, Dynamic Host Configuration Protocol, RFC 2131, Mar. 1997, pp. 1-39.*

(Continued)

*Primary Examiner* — Backhean Tiv
(74) *Attorney, Agent, or Firm* — Griffiths & Seaton PLLC

(57) ABSTRACT

A controller for use at a node of a clustered computer apparatus includes an exception detection component for detecting an exception raised by a service component at the node; a quiesce component responsive to the exception detection component for quiescing lease-governed activity by the service component prior to termination of a lease; a lease control component responsive to the quiesce component for pre-expiry relinquishing of the lease; and a communication component responsive to the lease control component for communicating the pre-expiry relinquishing of the lease to one or more further nodes of the clustered computer apparatus. The controller may further include a second communication component for receiving a communication indicating the pre-expiry relinquishing of a lease; a second lease control component responsive to the communication to control failure processing; and a second service component to perform a service in place of the service component at the node.

11 Claims, 2 Drawing Sheets

U.S. PATENT DOCUMENTS

| | | | |
|---|---|---|---|
| 7,400,580 B1* | 7/2008 | Synnestvedt et al. | 370/230 |
| 7,412,515 B2* | 8/2008 | Kupst et al. | 709/226 |
| 7,464,222 B2* | 12/2008 | Matsunami et al. | 711/114 |
| 7,471,637 B2* | 12/2008 | Moore et al. | 370/248 |
| 7,523,139 B1* | 4/2009 | Kemkar et al. | 1/1 |
| 7,533,255 B1* | 5/2009 | Dommety et al. | 713/151 |
| 7,577,146 B2* | 8/2009 | Arberg et al. | 370/392 |
| 7,702,786 B2* | 4/2010 | Bayus et al. | 709/225 |
| 7,720,864 B1* | 5/2010 | Muth et al. | 707/785 |
| 7,908,410 B2* | 3/2011 | Gildfind et al. | 710/29 |
| 7,916,634 B2* | 3/2011 | Synnestvedt et al. | 370/230 |
| 2002/0124163 A1* | 9/2002 | Homewood et al. | 712/244 |
| 2002/0188538 A1* | 12/2002 | Robertson et al. | 705/35 |
| 2003/0055877 A1* | 3/2003 | Williams et al. | 709/203 |
| 2003/0135381 A1* | 7/2003 | Mathiesen et al. | 705/1 |
| 2004/0123053 A1* | 6/2004 | Karr et al. | 711/152 |
| 2004/0153481 A1* | 8/2004 | Talluri | 707/200 |
| 2004/0153702 A1* | 8/2004 | Bayus et al. | 714/4 |
| 2008/0098256 A1* | 4/2008 | Halpern | 714/4 |
| 2009/0094366 A1* | 4/2009 | D'Costa et al. | 709/226 |
| 2009/0307338 A1* | 12/2009 | Arberg et al. | 709/221 |

OTHER PUBLICATIONS

T'Joens, T et al., DHCP reconfigure extension, Dec. 2001, RFC 3203, pp. 1-6.*

Droms, Dynamic Host Configuration Protocol, Mar. 1997, RFC 2131, pp. 1-39.*

* cited by examiner

CONTROLLING SERVICE FAILOVER IN CLUSTERED STORAGE APPARATUS NETWORKS

PRIORITY CLAIM

This application claims priority of United Kingdom patent application No. GB 0501697.7, filed on Jan. 27, 2005, and entitled, "Controlling Service Failover in Clustered Storage Apparatus Networks."

BACKGROUND

1. Technical Field

The present invention relates to controlling failover in storage apparatus, and, more particularly, to controlling failover in clustered storage apparatus networks.

2. Description of Related Art

The concept of clustering of computer systems is well-known in the art. Nevertheless, a brief summary of the background may be helpful in understanding the present invention in its preferred embodiments.

A cluster consists of a group of computer systems (henceforth known as 'nodes') that operate together to provide a service to one or more clients or applications. One of the benefits of clustered systems is the ability to continue operation in the face of failure to one or more nodes within the cluster: in the event of some nodes within the cluster failing the work being performed by these nodes is redistributed to the surviving members of the cluster. Even with node failures the cluster continues to offer a service to its clients, although typically with reduced performance.

With most clustered systems it is necessary to prevent a cluster which is split into two groups of nodes from allowing both groups of nodes to continue operating as independent clusters. This problem is normally solved by introducing the concept of a quorum—a minimal set of nodes required for the cluster to continue operation. When a cluster of nodes is partitioned into two groups one group will maintain a quorum and will continue operating while the other group will be inquorate and will cease to participate in the cluster. To achieve this each node in the cluster needs to check that it is still part of the quorum as it processes service requests so that as soon as it determines it is in an inquorate group it stops participating in the cluster. This is typically achieved either by using heartbeats or a lease. The concepts of heartbeats and leases as means for controlling connected systems are well-known in the art, but, for better understanding of the present disclosure, a brief introduction to the relevant concepts related to leases is offered here.

A lease permits a node to offer a service on behalf of the cluster without having to refer to its cluster peers to service each request. The lease defines a time-limited period during which the node can offer the service without further reference to the peers. An infrequent message can be used to extend the lease, so that the node can continue to offer the service for a long period. In the event of a loss of communications with a node that has been granted a lease, the peer nodes of the prior art typically wait for a period of time not less than the lease before being assured that the node has stopped participating in the cluster and allowing the transfer of work from the failing node to surviving nodes within the cluster.

The concept of lease is particularly valuable in clustered systems which must present a coherent image of some changing information, and in which requests to view that information must be serviced with minimal cost, certainly less than that required to correspond with other nodes.

The lease time defines the minimum period during which a service is unavailable following a failure (henceforth 'failover time'). Even short periods of unavailability will appear as glitches in system operation which will decrease customer satisfaction. Minimising this time improves the quality of the system. The shorter the lease time used by the cluster the faster the failover time. However, the shorter the lease time the more frequently nodes within the cluster need to extend the lease and consequently the greater the overheads are for maintaining the lease. The minimum lease time is also bounded by the speed of communications between nodes—the lease time cannot be less than the time it takes to communicate a lease extension. Therefore, while it is desirable to have a very short lease time to minimise the failover time, in practice this is often not possible.

The governing of systems using leases ensures correct operation in the face of almost any failure (it is dependent on the correct operation of a clock). However, it is a rather conservative measure, and there is a particular class of system failure which is common and where it would be desirable to avoid the overhead of a lease operation, namely that of software failure caused by an 'assert'—a form of failure where the software itself has detected some illegal or unexpected situation and has determined it is safer to exit and restart than to continue operation.

The normal method for improving failover time in a lease-based system is to make the lease time as short as possible. The disadvantage of this method is that the more frequently a lease needs to be renewed, the higher the overheads are for maintaining the lease. The minimum lease time cannot be less than the time it takes to communicate a lease extension. Many clustered systems require dedicated hardware to allow nodes in the cluster to communicate lease extensions as quickly as possible.

SUMMARY OF THE INVENTION

A controller for use at a node of a clustered computer apparatus includes an exception detection component for detecting an exception raised by a service component at the node; a quiesce component responsive to the exception detection component for quiescing lease-governed activity by the service component prior to termination of a lease; a lease control component responsive to the quiesce component for pre-expiry relinquishing of the lease; and a communication component responsive to the lease control component for communicating the pre-expiry relinquishing of the lease to one or more further nodes of the clustered computer apparatus.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
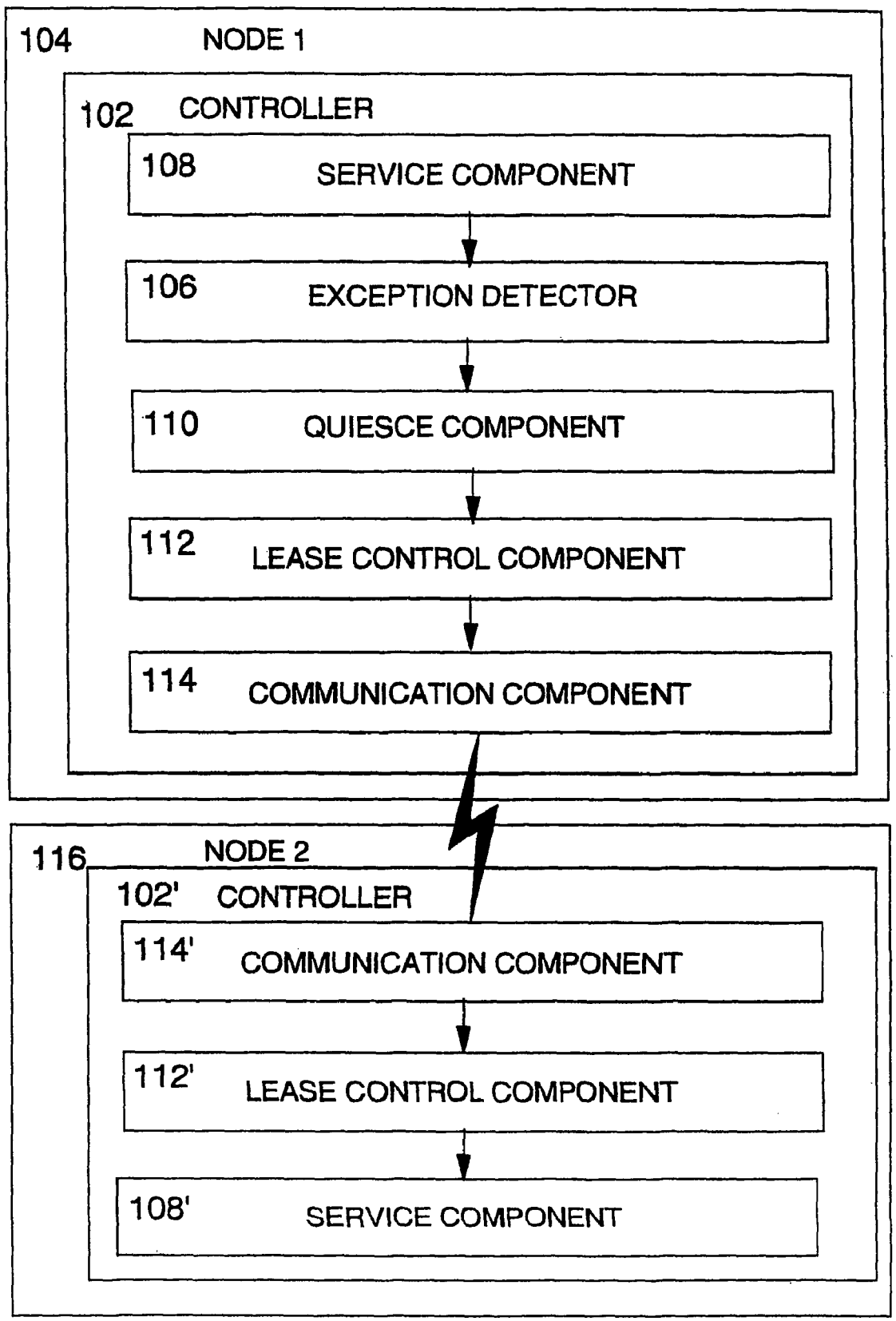
FIG. 1 shows in schematic form one type of apparatus in which the present invention may be embodied.

Turning now to FIG. 1, there is shown an exemplary apparatus in which a preferred embodiment of the present invention may be implemented.

FIG. 1 shows a controller 102 for use at a node 104 of a clustered computer apparatus. The controller 102 comprises an exception detection component 106 for detecting an exception raised by a service component 108 at node 104, a quiesce component 110, which is responsive to the exception detection component 106 for quiescing lease-governed activity by service component 108 prior to the termination of its lease. The controller also comprises a lease control component 112 responsive to quiesce component 110 for pre-expiry relinquishing of the lease, and a communication component 114 responsive to the lease control component 112 for communicating the pre-expiry relinquishing of the lease to one or more further nodes 116 of the clustered computer apparatus.

The controller shown in FIG. 1 may also comprise a further communication component 114' for receiving a communication indicating the pre-expiry relinquishing of a lease; a further lease control component 112' responsive to the communication to control failure processing; and a further service component 108' to perform a service in place of the original service component 108 at the original node 104.

It will be clear from the foregoing to any person of ordinary skill in the art that, while the functional elements of the preferred embodiment of the present invention have been described in terms of discrete components, they may equally be implemented in various combinations of integrated or discrete components which may be linked by electrical or electronic means or by any equivalent means for communicating control and information therebetween.

In preferred embodiments, the controller of FIG. 1 comprises both the components implementing the functions of NODE 1 and those implementing the functions of NODE 2. It will be clear to one of ordinary skill in the art that, while this is preferred, the functions may be separated according to the requirements of the individual system.

Figure 2:
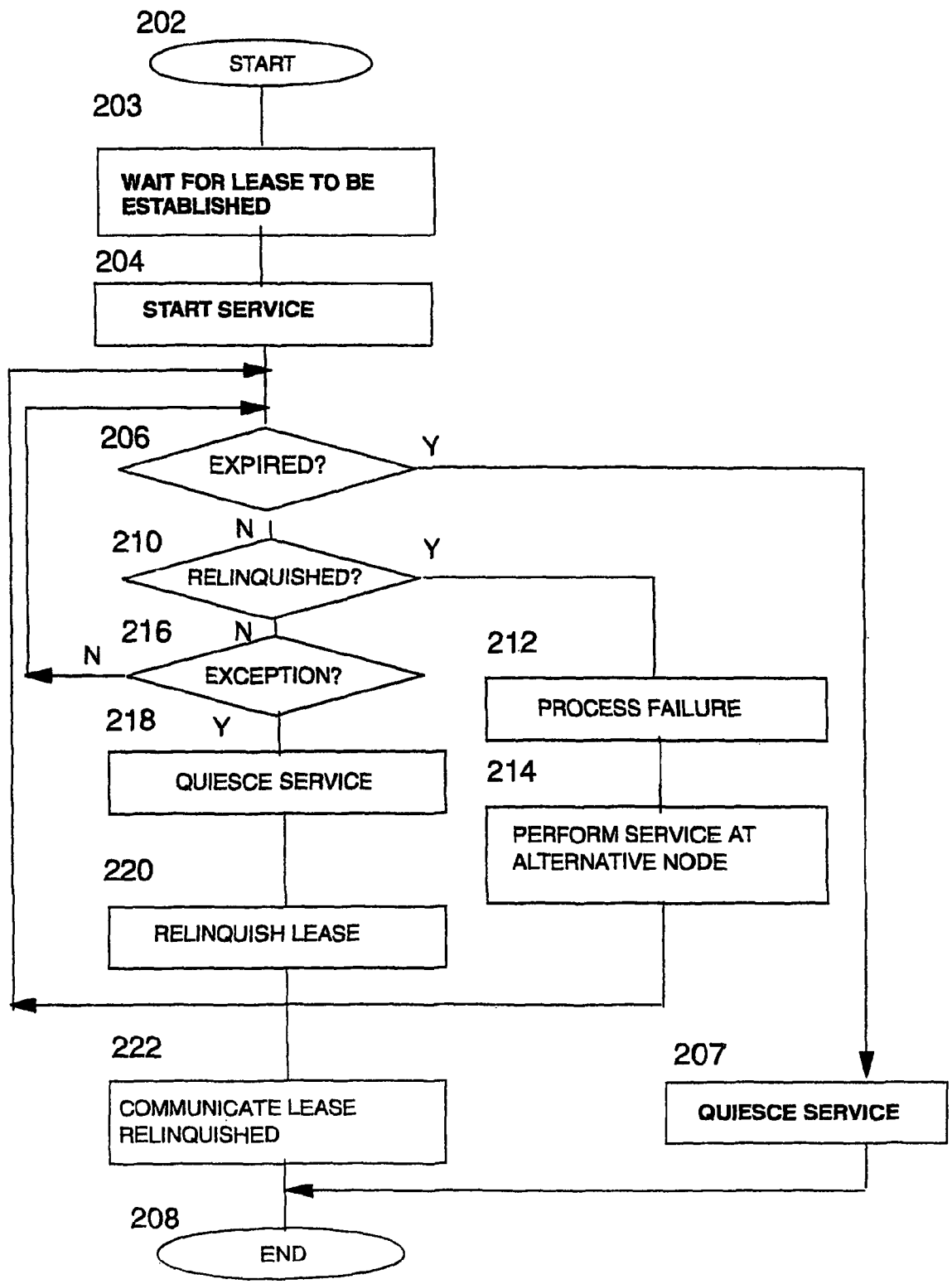
FIG. 2 shows a flow diagram of a method for operating a controller according to a preferred embodiment of the present invention.

Turning now to FIG. 2, there is shown a flow diagram of a system governed by leases in which a preferred embodiment of the present invention may be implemented.

The method begins conventionally at step 202, and at step 203 a lease is awaited (a lease may be newly granted or renewed) as in a conventional system according to the prior art. When a lease is established, at step 204, one or more lease-governed services are started. Conventionally, also, at step 206, a test is performed to determine if a lease has expired. If so, the process quiesces the service at step 207 and proceeds to end step 208 in the conventional manner. If the lease has not expired, a test is performed at step 210 to determine whether a lease has been relinquished by a communicating node. If so, the failure is processed at step 212 and at step 214 the service is performed by an alternative node. The process then returns to the test at step 206 and continues. It will be clear to one skilled in the art that, in multiprocessor systems, the service may equally be performed by the same node, but in an alternative processor. Variations and modifications will naturally occur to one of ordinary skill in the art. The process proceeds then to end step 208 in a conventional manner.

If no relinquished lease has been detected at step 210, a test is performed to determine whether an exception has been detected within the local software service layer. If not, processing continues by returning to a point prior to step 206. If an exception has been detected, the service is quiesced at step 218. On completion of the quiesce process, the unexpired lease is relinquished at step 220. At step 222, the notification that the lease has been relinquished is communicated to a communicating node, and the process completes at end step 208. In the communicating node, as described above, the notification is detected at step 210, and processing continues as previously outlined.

Thus, in summary, there is shown a method of operating a controller for use at a node of a clustered computer apparatus, comprising steps of: detecting, by an exception detection component, an exception raised by a service component at the node; quiescing, by a quiesce component responsive to the exception detection component, lease-governed activity by the service component prior to termination of a lease; pre-expiry relinquishing, by a lease control component responsive to the quiesce component, of the lease; and communicating, by a communication component responsive to the lease control component, the pre-expiry relinquishing of the lease to one or more further nodes of the clustered computer apparatus.

A node may be further adapted to perform the additional steps of receiving, by a further communication component, a communication indicating the pre-expiry relinquishing of a lease; controlling failure processing by a further lease control component responsive to the communication; and performing, by a further service component, a service in place of the service component at the original node.

It will be clear to one skilled in the art that the method of the present invention may suitably be embodied in a logic apparatus comprising logic means to perform the steps of the method, and that such logic means may comprise hardware components or firmware components.

It will be appreciated that the method described above may also suitably be carried out fully or partially in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

The present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

It will be further appreciated that embodiments of the present invention may be provided in the form of a service deployed on behalf of a customer to offer offsite disaster recovery services.

It will also be appreciated that various further modifications to the preferred embodiment described above will be apparent to a person of ordinary skill in the art.

What is claimed is:

1. A controller for use at a node of a cluster of nodes, comprising:
    a memory configured to store: an exception detection component configured to detect an exception raised by a first service component at said node;
    a quiesce component in communication with said exception detection component, said quiesce component configured to temporarily render inactive lease-governed activity by said first service component prior to termination of a lease in response to said detection of said exception;
    a first lease control component in communication with said quiesce component, said first lease control component configured to pre-expiry relinquish said lease in response to the inactivity of said lease-governed activity;
    a first communication component in communication with said first lease control component, said first communication component configured to communicate the pre-expiry relinquish of said lease to one or more other nodes of said cluster of nodes in response to detection of said pre-expiry relinquish of said lease;
    a second communication component in communication with said first communication component, said second communication component configured to receive a communication indicating the pre-expiry relinquishing of said lease;
    a second lease control component in communication with said second communication component, said second lease control component responsive to said communication and configured to control failure processing; and
    a second service component coupled to said second lease control component and configured to perform a service in place of said first service component at said node, wherein said lease enables the one or more other nodes to offer services on behalf of the cluster of nodes without referring to remaining nodes in said cluster of nodes to service each request.

2. The controller as claimed in claim 1, wherein said second communication component is located in a clustering layer, and said second lease control component and said second service component are located in a layer above said clustering layer.

3. The controller as claimed in claim 1, wherein said exception detection component, said quiesce component and said first lease control component are located in a layer above a clustering layer, and said first communication component is located in said clustering layer.

4. A method of operating a controller for use at a node of a cluster of nodes comprising:
    detecting, by an exception detection component, an exception raised by a first service component at said node;
    temporarily rendering inactive, by a quiesce component in communication with said exception detection component, lease-governed activity by said first service component prior to termination of a lease in response to detecting said exception;
    pre-expiry relinquishing, by a first lease control component, of said lease in response to the inactivity of said leased-governed activity, wherein the first lease control component in communication with said quiesce component; and
    communicating, by a first communication component in communication with said first lease control component, the pre-expiry relinquishing of said lease to one or more other nodes of said cluster of nodes in response to detection of said pre-expiry relinquishing of said lease;
    receiving, by a second communication component in communication with said first communication component, a communication indicating the pre-expiry relinquishing of said lease;
    controlling failure processing in response to said communication by a second lease control component in communication with said second communication component; and
    performing, by a second service component coupled to said second lease control component, a service in place of said first service component at said node, wherein said lease enables the one or more other nodes to offer services on behalf of the cluster of nodes without referring to remaining nodes in said cluster of nodes to service each request.

5. The method as claimed in claim 4, wherein said detecting, rendering inactive, and pre-expiry relinquishing are performed in a layer above a clustering layer, and said communicating is performed in said clustering layer.

6. The method as claimed in claim 4, wherein said receiving is performed in a clustering layer, and said controlling and performing a service are performed in a layer above said clustering layer.

7. A non-transitory computer-readable medium comprising instructions that, when executed by a processor, cause the processor to perform a method comprising steps of:
    detecting, by an exception detection component, an exception raised by a first service component at a node;
    temporarily rendering inactive, by a quiesce component in communication with said exception detection component, lease-governed activity by said first service component prior to termination of a lease in response to detecting said exception;
    pre-expiry relinquishing, by a first lease control component, of said lease in response to the inactivity of said lease-governed activity, wherein the first lease control component in communication with said quiesce component; and
    communicating, by a first communication component in communication with said first lease control component, the pre-expiry relinquishing of said lease to one or more other nodes of a cluster of nodes in response to detection of said pre-expiry relinquishing said lease;
    receiving, by a second communication component in communication with said first communication component, a communication indicating the pre-expiry relinquishing of said lease;
    controlling failure processing in response to said communication by a second lease control component in communication with said second communication component; and
    performing, by a second service component coupled to said second lease control component, a service in place of said first service component at said node, wherein said lease enables the one or more other nodes to offer services on behalf of the cluster of nodes without referring to remaining nodes in said cluster of nodes to service each request.

8. The non-transitory computer-readable medium of claim 7, further comprising instructions that cause said processor to perform the detecting, rendering inactive, and pre-expiry relinquishing steps in a layer above a clustering layer, and to perform said communicating step in said clustering layer.

9. The non-transitory computer-readable medium of claim 7 further comprising instructions that cause said processor to perform the steps of:
receiving in a clustering layer; and controlling in a layer above said clustering layer.

10. The non-transitory computer-readable medium of claim 7, further comprising instructions that cause said processor to perform the step of controlling a storage apparatus.

11. The non-transitory computer-readable medium of claim 10, further comprising instructions that cause said processor to perform the step of controlling virtualization of said storage apparatus.

* * * * *